(12) United States Patent
Nooner

(10) Patent No.: US 10,643,117 B2
(45) Date of Patent: May 5, 2020

(54) ELECTRONIC DEVICE FOR ATTACHMENT TO A BEVERAGE CONTAINER

(71) Applicant: MIDWEST INNOVATIVE PRODUCTS, LLC, Frankfort, IL (US)

(72) Inventor: Bryan Nooner, Frankfort, IL (US)

( * ) Notice: Subject to any disclaimer, the term of this patent is extended or adjusted under 35 U.S.C. 154(b) by 0 days.

(21) Appl. No.: 16/109,083

(22) Filed: Aug. 22, 2018

(65) Prior Publication Data
US 2019/0065924 A1  Feb. 28, 2019

Related U.S. Application Data

(60) Provisional application No. 62/549,067, filed on Aug. 23, 2017.

(51) Int. Cl.
| G06K 19/077 | (2006.01) |
| G06K 19/07 | (2006.01) |
| G01P 15/00 | (2006.01) |
| H04W 4/35 | (2018.01) |
| G06F 3/16 | (2006.01) |

(52) U.S. Cl.
CPC ...... *G06K 19/07758* (2013.01); *G01P 15/003* (2013.01); *G06F 3/165* (2013.01); *G06F 3/167* (2013.01); *G06K 19/0704* (2013.01); *G06K 19/0717* (2013.01); *G06K 19/0723* (2013.01); *G06K 19/07709* (2013.01); *H04W 4/35* (2018.02)

(58) Field of Classification Search
CPC .......................... G06Q 10/087; G06Q 10/0875
USPC ........................................ 235/385, 375, 487
See application file for complete search history.

(56) References Cited

U.S. PATENT DOCUMENTS

| 4,642,999 | A | 2/1987 | Justice | |
| 9,576,453 | B2* | 2/2017 | Strassburger | B65D 23/14 |
| 9,607,259 | B2* | 3/2017 | Norman | B65D 23/14 |
| 9,677,923 | B1 | 6/2017 | Daneyshar | |
| 2008/0272916 | A1* | 11/2008 | Breysse | B65D 41/62 |
| | | | | 340/572.8 |
| 2008/0291025 | A1* | 11/2008 | Perez | E05B 73/00 |
| | | | | 340/572.1 |

(Continued)

FOREIGN PATENT DOCUMENTS

WO    0044642 A1    8/2000

OTHER PUBLICATIONS

PCT, Notification of Transmittal of the International Search Report and the Written Opinion of the International Searching Authority, or the Declaration, in Internatioal Application No. PCT/US2018/047564, dated Oct. 24, 2018 (3 pages).

*Primary Examiner* — Edwyn Labaze
(74) *Attorney, Agent, or Firm* — McAndrews, Held & Malloy, Ltd.

(57) ABSTRACT

An electronic device, system, and method for sending and receiving a communication relating to a beverage bottle to and from an electronic device, in which the electronic device may include a receiving portion including an aperture configured to receive a neck of a beverage container; a processor; memory; wireless communication circuitry; at least one actuator; and at least one indicator. The electronic device may be configured to attach to the neck of the beverage container via the receiving portion. The wireless communication circuitry may be configured to receive a wireless communication. The processor may be configured to activate the at least one indicator in response to the communication.

3 Claims, 16 Drawing Sheets

(56) References Cited

U.S. PATENT DOCUMENTS

| | | | |
|---|---|---|---|
| 2010/0005840 A1* | 1/2010 | Hogan | E05B 73/0017 |
| | | | 70/63 |
| 2010/0224552 A1* | 9/2010 | Varga-Molnar | D04B 21/16 |
| | | | 210/490 |
| 2012/0024962 A1* | 2/2012 | Kolton | B65D 23/14 |
| | | | 235/492 |
| 2013/0321153 A1* | 12/2013 | Yang | G08B 13/2434 |
| | | | 340/572.1 |
| 2014/0138276 A1 | 5/2014 | Smith | |
| 2015/0307245 A1 | 10/2015 | Puccini | |
| 2015/0334079 A1 | 11/2015 | Laidlaw | |
| 2015/0363686 A1* | 12/2015 | Yang | G06K 19/07773 |
| | | | 235/492 |
| 2016/0015885 A1* | 1/2016 | Pananen | A61M 5/5086 |
| | | | 604/111 |
| 2016/0180690 A1* | 6/2016 | Bentkovski | B65D 51/248 |
| | | | 340/604 |
| 2016/0264394 A1 | 9/2016 | Hershberger | |
| 2017/0129664 A1* | 5/2017 | Hatamian | B65D 51/243 |
| 2019/0026616 A1* | 1/2019 | Bourque | G06K 19/0723 |
| 2019/0205715 A1* | 7/2019 | Kato | B65D 41/62 |

\* cited by examiner

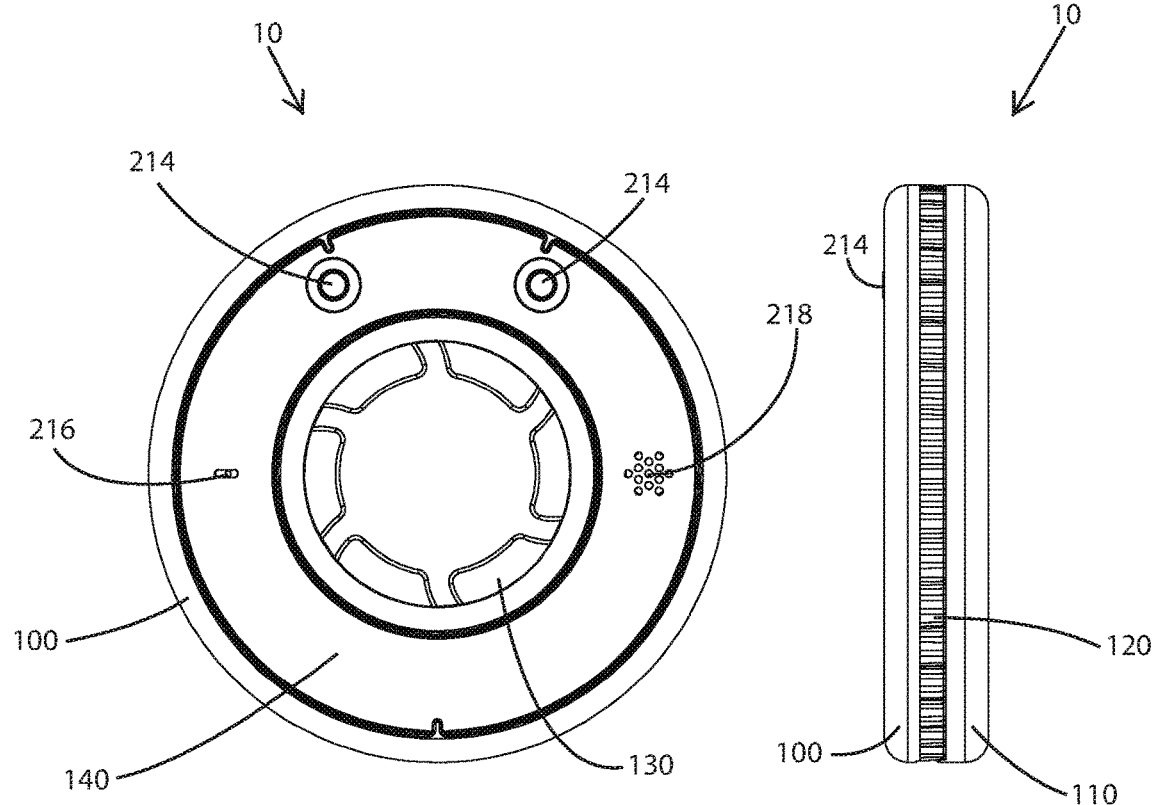
FIG. 6
FIG. 8
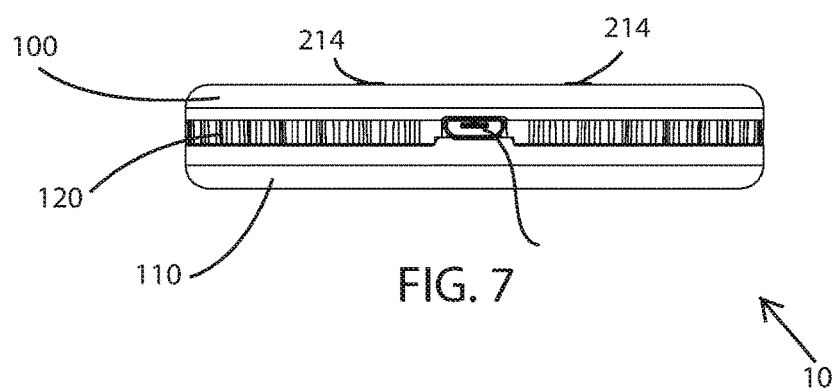
FIG. 7

ELECTRONIC DEVICE FOR ATTACHMENT TO A BEVERAGE CONTAINER

CROSS REFERENCE TO RELATED APPLICATIONS

This application claims priority to U.S. Pat. Appl. Ser. No. 62/549,067 filed on Aug. 23, 2017, which is herein incorporated by reference in its entirety.

BACKGROUND

Certain embodiments of the disclosure relate to an electronic device for attachment to a beverage container. More specifically, certain embodiments of the disclosure relate to techniques for sending and receiving communications to/from an electronic device attached to the neck of a beverage container to/from an application, in which the communication relates to the beverage container to which the electronic device is attached.

Existing methods and systems for providing information about, identifying, and tracking beverage bottles may be costly, inefficient, and tedious. Further limitations and disadvantages of conventional and traditional approaches will become apparent to one of skill in the art, through comparison of such systems with the present disclosure as set forth in the remainder of the present application with reference to the drawings.

SUMMARY

Disclosed is an example electronic device. In one example, the electronic device may include: a receiving portion including an aperture configured to receive a neck of a beverage container; a processor; memory; wireless communication circuitry; and at least one indicator. The electronic device may be configured to attach to the neck of the beverage container via the receiving portion. The wireless communication circuitry may be configured to receive a wireless communication. The processor may be configured to activate the at least one indicator in response to the communication.

In one example, the at least one indicator the electronic device includes a visual indicator. In another example, the at least one indicator the electronic device includes a auditory indicator. An example electronic device may further include a microphone and at least one actuator. In such an example, the processor may be configured to detect an actuation of the at least one actuator. Further, the device may be configured to, subsequent to the detection of an actuation, receive an auditory signal for recordation via the microphone, whereby a representation of the auditory signal is stored in the memory. In the example, the at least one indicator may include a speaker, and the processor may be configured to detect an actuation of the at least one actuator, and subsequent to the detection of an actuation, cause the representation of the auditory signal to be played via the speaker.

In one example, the electronic device may include a temperature sensor. In such an example, the temperature sensor may be configured to measure a temperature and generate a temperature signal encoding the measured temperature. Further, the processor may be configured to cause the wireless communication circuitry to wirelessly transmit a communication including data reflective of the measured temperature. In another example, the electronic device may include a an accelerometer. In such an example, the accelerometer may be configured sense a movement of the electronic device and generate a movement signal encoding the sensed movement. Further, the processor may be configured to cause the wireless communication circuitry to wirelessly transmit a communication including data reflective of the sensed movement.

In one example, the receiving portion of the electronic device may completely encompass the aperture. In another example, the receiving portion of the electronic device may only partially encompass the aperture. In a further example, the electronic device may include at least one flap proximate the aperture, and the flap may be movable in relation to the receiving portion. In another example, the at least one flap may include a plurality of flaps. In one example, the electronic device may include a foam portion proximate the aperture.

Also disclosed is an example electronic system for transmitting and receiving communications. The example system may include: an application configured to be executed on a computing device; an electronic device. The example electronic device may include: a receiving portion including an aperture configured to receive a neck of a beverage container and to removably attach the electronic device to the neck; a processor; memory; wireless communication circuitry; and at least one indicator. The electronic device may be configured to attach to the neck of the beverage container via the receiving portion. The wireless communication circuitry may be configured to wirelessly receive a communication from the computing device executing the application. The processor may be configured to activate the at least one indicator in response to the communication.

In one example, the at least one indicator of the electronic device of the electronic system includes a visual indicator. In another example, the at least one indicator of the electronic device of the electronic system includes an auditory indicator. The electronic device of the electronic system may further include a temperature sensor. The temperature sensor may be configured to measure a temperature and generate a temperature signal encoding the temperature. In such an example, the processor may be configured to cause the wireless communication circuitry to wirelessly transmit a communication, including data reflective of the measured temperature, for processing by the application. The electronic device of the electronic system may also include an accelerometer. The accelerometer may be configured sense a movement of the electronic device and generate a movement signal encoding the sensed movement. In such an example, the processor may be configured to cause the wireless communication circuitry to wirelessly transmit the communication, including data reflective of the sensed movement, for processing by the application.

Also disclosed is an example method for wirelessly transmitting a communication from an application configured to run on a computing device to at least one of a plurality of electronic devices each configured to attach to a respective neck of a beverage container. In one example, the method may include establishing on the application a parameter for a beverage container having a condition; comparing the parameter to the condition; if the parameter is equal to or inclusive of the condition, transmitting from the computing device a communication to a subset of the plurality of electronic devices; and activating in response to the communication at least one indicator in each of the subset of a plurality of electronic devices.

In one example, the at least one indicator of the method may include a visual indicator that, when activated, the at least one indicator emits light. In another example, the at least one indicator of the method may include an auditory indicator that, when activated, the at least one indicator emits sound.

Various advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 6 is a front elevation view of the example electronic device of FIG. 4.

FIG. 7 is a bottom plan view of the example electronic device of FIG. 4.

FIG. 8 is a right side elevation view of the example electronic device of FIG. 4.

Figure 1:
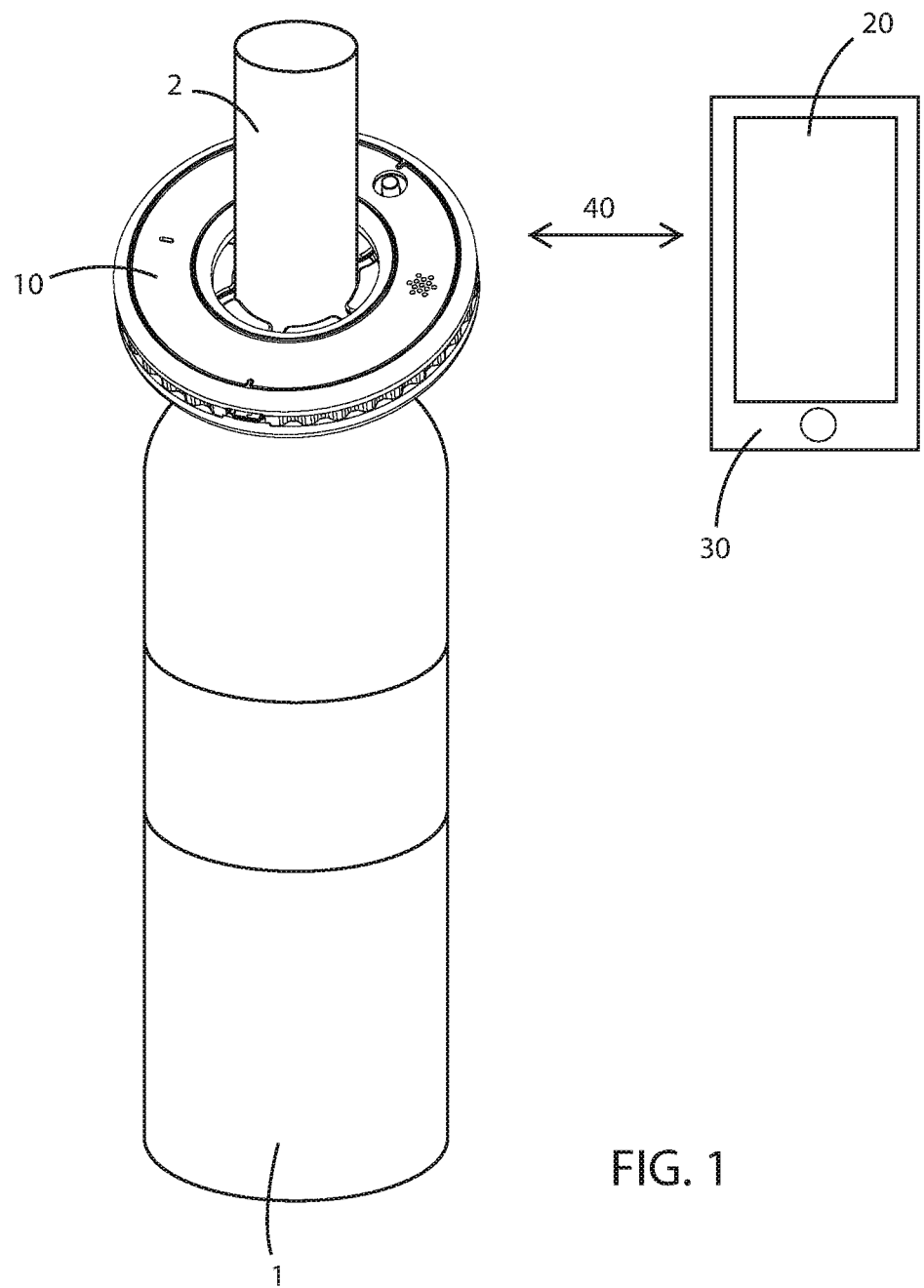
FIG. 1 is a perspective view of an example electronic device paired to an application running on a computing device, and attached to a neck of a beverage container, in accordance with aspects of this disclosure.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION OF THE DISCLOSURE

As utilized herein the terms "circuit" and "circuitry" refer to physical electronic components (i.e., hardware) and any software and/or firmware ("code") which may configure the hardware, be executed by the hardware, and/or otherwise be associated with the hardware. As utilized herein, "and/or" means any one or more of the items in the list joined by "and/or." As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "example" means serving as a non-limiting exemplary instance or illustration. As utilized herein, the terms "e.g." and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

FIG. 1 shows an example electronic device 10 attached to a neck 2 of a beverage container 1, for example a wine bottle. The electronic device 10 allows a user to record information and send and receive various types of communications containing information and alerts about a particular bottle of wine to which the electronic device 10 is "attached." As used herein, when the electronic device 10 attaches or is attached to the neck 2, it is removably or non-permanently attached such that the electronic device 10 can be removed without damage to the electronic device 10 or the neck 2. A wine bottle is used as an example herein, but it is to be understood that the device may be attachable to any suitable beverage container. The electronic device 10 may fit around the neck 2 of the wine bottle 1. In one embodiment, the electronic device 10 is attached to the beverage container 1 by sliding the electronic device 10 onto the neck 2 of the beverage container 1. In an alternative embodiment, the electronic device 10 clamps on the side of the neck 2 of the beverage container 1.

In addition to the electronic device 10, an application 20 running on a computing device 30 such as a personal computer (e.g., laptop computer, desktop computer), and/or handheld devices (e.g., tablet, mobile/smart phone, smart watch) may be capable of communicating with the electronic device 10 via the computing device 30 and a wireless communication link 40. The electronic device 10 may be WiFi-enabled (or employ one or more other suitable wireless technolog(ies), such as Bluetooth, NFC, or the like). The electronic device 10 may communicate (e.g., "pair") wirelessly with the computing device 30 that executes the application 20. The electronic device 10 may send/receive information to/from the application 20.

In an example embodiment of the disclosure, the electronic device 10 may be pre-programmed, via the computing device 30 that execute the application 20, to associate the electronic device 10 with one or more beverage container(s) 1. In an example embodiment of the disclosure, one or more electronic devices 10 may form a network of electronic devices 10 to facilitate, for example, inventory management of beverage containers 1. In an example embodiment of the disclosure, each of the one or more electronic devices 10 may be associated with a respective beverage container 1.

The electronic device 10 may interact with one or more applications 20 via one or more computing devices 30 via link 40. Link 40 may correspond to each respective electronic device 10. For example, the link 40 may be implemented and/or configured to operate using one or more wireless protocol, such as, for example, WPAN (e.g., Bluetooth or ZigBee), low power links (e.g., Bluetooth LE (BLE), Bluetooth Smart, iBeacon), near field communication protocols (e.g., NFC) and/or WLAN protocols (e.g., 802.11) and/or any other wireless links and/or protocols suitable for implementation consistent with the disclosure. Alternatively, the electronic device 10 may be connected via a wired link to a computing device 30 via wired protocols and/or links such as, for example, Ethernet, Universal Serial Bus (USB), and/or any other wired links and/or protocols suitable for implementation consistent with the disclosure.

In an example embodiment of the disclosure, the application 20 may interact with one or more electronic devices 10 via the computing device 30 directly and/or indirectly. For example, the application 20 may interact with one or more electronic devices 10 via the computing device 30 directly through a corresponding link (e.g., wireless, wired link/connection).

In another example, the electronic device 10 may interact with one or more network element devices 120a-120o, indirectly through a communication network 400, such as a network controller (e.g., cloud based server or other external network). In such an example, the application 20 interacts via the computing device 30 with the communication network 400, and the communication network 400 in turn interacts with the one or more electronic devices 10. Such an example may be advantageous to control a plurality of electronic devices 10 from a single computing device 30 executing the application 20.

In another example, the application 20 may interact with one or more electronic devices 10, indirectly through, for example, other electronic devices 10. In this regard, the application 20 may interact with one or more electronic devices 10, on, for example, a mesh network. An example mesh network (not shown) may facilitate communication (e.g., transmission of communications, signals, data frames) to and/or from the application 20 to and/or from a particular electronic device 10 where the communication may, for example, pass through one or more other electronic devices 10 before reaching the particular electronic device 10 and/or the application 20.

In an example embodiment of the disclosure, the application 20 may be operable to support one or more communication methods from one or more electronic devices 10. For example, one or more electronic devices 10, may communicate with the application utilizing a particular wireless link and/or protocol (e.g., Bluetooth) and/or a particular wired link and/or protocol (e.g., Ethernet), while one or more other electronic devices 10, may communicate with the application utilizing a different particular wireless link and/or protocol (e.g., WiFi) and/or a different particular wired link and/or protocol (e.g., USB).

In an example embodiment of the disclosure, the same one or more electronic device 10 may communicate with the application 20 by, for example, using one or more wired and/or wireless links and/or protocols at the same and/or at different times. For example, a particular electronic device 10 communicate with the application 20 using a Bluetooth communication protocol for a particular communication and may communicate with the application 20 using a WiFi communication protocol for another particular communication.

In an example embodiment of the disclosure, one or more electronic devices 10, may communicate with one or more different electronic devices 10, directly. In this regard, the one or more electronic devices 10 may utilize one or more communication links (e.g., wireless, wired) (not shown) and/or one or more network interfaces and/or other interfaces without directing (e.g., routing the communication through, for example, a network 400. For example, an electronic devices 10 may be operable to detect existence of one or more other electronic devices 10 (e.g., on the same and/or different network) and may initiate, send and/or receive communication to and/or from the one or more other electronic devices 10.

In an example embodiment of the disclosure, if one electronic devices 10 becomes out of range of the computing device 30 executing the application 20 to interact directly with the application 20, the electronic device 10 may automatically communicate with the network 400 to interact indirectly with the application 20. The electronic device 10 may also communicate with one or more other electronic devices 10 to determine whether the one or more other electronic devices 10 are within range of the computing device 30 device previously within range of the one electronic device 10, to interact directly. The range detection and/or discovery may continue from electronic device 10 device to another.

In an example embodiment of the disclosure, one or more electronic devices 10 and the application 20 may cooperate (e.g., exchange information) to, for example, collectively and/or individually indicate a precise location of a particular electronic device 10 based on the electronic device 10 receiving one or more communications and/or signals and/or messages from the application 20. For example, the application 20 may generate a communication and/or signal and transmit the communication via the computing device 30 directly or indirectly to an electronic device 10. The electronic device 10 may receive the communication. The communication may then trigger an indicator on the electronic device 10. The indicator may be visual (e.g., flashing light generated by a light source 208) or audio (e.g., a sound generated by a speaker 218).

In operation, the application 20 may be operable to manage one or more electronic devices 10 via a network (e.g., the network 400), for example, to keep inventory of beverage containers 1. The application 20 may be utilized, for example, as an interface platform for interacting with the one or more electronic devices 10. In this regard, the application 20 may support establishing and/or configuring one or more communication connections/links (e.g., the links 40) with the one or more electronic devices 10. Once established, the connectivity between the application 20 and the electronic devices 10 may, for example, be utilized to enable centralized monitoring, control, and/or management of the electronic devices 10 and/or one more external parameters measured or sensed by the electronic devices 10, such as for example, if the electronic device 10 is moving, or the air temperature of the electronic device 10.

For example, in some implementations, the application 20 may be configured to generate and/or use a graphic user interface (GUI) through the computing device 30, for visually displaying information and/or providing interactivity with users (e.g., for providing input thereby). One or more user interfaces may enable configuring the electronic device 10 and/or functions provided by the electronic device 10. In an example embodiment of the disclosure, the one or more user interfaces may enable user interaction with, configuring and/or one or more electronic devices 10).

An example application 20 allows a user to interact with various functions of the electronic device 10, although certain functions of the electronic device 10 such as recording and playback of audio can work independently without input from the application 20. It may be possible to reset the electronic device 10 (e.g., erase some or all of the memory) through the application 20.

The application 20 may include an example audio recording feature. The audio recording feature may enable recording of audio information through the computing device 30, and the recorded audio may be transferred to the electronic device 10 and stored on memory 204. The recorded audio may also be saved on the computing device 30 (e.g., in association or accessible through the application 20). In one example recorded audio may for example be information concerning a given vintage about that particular bottle of wine uploaded to the electronic device 10 by the wine maker. In another example, a user may record a unique message onto the electronic device 10 to make a gifting experience more personal and interactive.

The application 20 may include an alert feature. In the alert feature, alerts may be scheduled via the application 20 so the user may be alerted at specific times (e.g., date and time). Possible alert events include when a particular bottle has reached maturity or when it should be opened for a special occasion such as an anniversary or any other desired time. Alerts may be communicated to the electronic device 10, where they may be stored locally on the memory 204. The electronic device 10 may include its own clock and determine when alerts are to take place and cause a corresponding notification via the indicator (e.g., light source 208 and/or speaker 218) to occur. Alert notifications may also be generated by the application 20 and/or computing device 30 and provided to the user (e.g., visual, audio, push notification, email, text, etc.). Alerts and/or notifications may also be generated in response to motion detection by an accelerometer 210 of the electronic device 10 and/or temperature events sensed by a temperature sensor 220 (temperature exceeding max and/or min thresholds).

The application 20 may also include a scheduling feature. The scheduling feature may allow a user to set date and/or time alerts so that the user is notified of when a particular bottle has reached maturity or when it should be opened for a special occasion such as an anniversary or any other desired time. The scheduling information may be transferred to the electronic device 10 and stored on memory 204. The scheduling information may also be saved on the computing device 30 (e.g., in association or accessible through the application 20). When scheduled alerts are due (e.g., when the current date and/or time matches and/or exceeds the set date and/or time) a processor 202 may trigger an indicator (e.g., a light source 208 will glow and/or a speaker 218 will make a noise) on the electronic device 10 and a reminder will appear on the application 20 signaling the user scheduled event.

The application 20 may also include a notes feature. The notes feature may allow a user to add notes and/or comments about a particular bottle of wine in the application 20 (e.g., ranking, food pairings, etc.). The notes may be written or recorded as an auditory signal. The application 20 or other applications executing on the electronic device 30 may be operable to transcribe auditory note into a written note. The notes feature may be useful in remembering various aspects of the wine bottle such as the person or place where the wine came from, the situation, occasion or place the bottle was received, and cost of the wine. A note could include for example "This wine was given to us by Mom & Dad on our 1st wedding anniversary. Set a reminder to open on our 5th anniversary." Alternatively, a note could include "Bought this bottle of wine at the Barnett Winery in Napa Valley on Oct. 20, 2017. Wine maker suggests waiting 5 years to open. We paid $150.00."

The application 20 may also include a picture finder function. The picture finder function may allow a user to search a database for a picture of a particular bottle of wine. For example, the application 20 may search a database or the Internet to identify various characteristics of the wine, such as average score, average price, winemaker notes, region, origin, where to buy, etc., based on the picture of the bottle of wine.

The application 20 may also include an inventory feature. The inventory feature may catalog bottles of wine (i.e., beverage container 1) to which an electronic device 10 is attached in a digital library saved on the computing device 30 and/or a communication network 400 (e.g., cloud based storage). In the wine bottle example, the application 20 may arrange the bottles according to several criteria such as: red, white, Cabernet, blend etc. The application 20 may also arrange and catalog bottles of wine by age, origin, maturity, type of grape, and/or flavor. Other cataloging criteria are also possible. The application 20 may also keep track of the number of wine bottles in a collection.

The application 20 may also include a bottle finder feature. The bottle finder feature may allow a user to locate a particular bottle from the application 20 by clicking for example a graphical user interface digital button including the word "find" next to the particular cataloged wine bottle in the digital library. In response, the computing device 30 may transmit a communication to the electronic device 10 attached to that particular bottle of wine (i.e., beverage container 1) The electronic device 10 attached to the bottle of wine may provide a visual or audio alert (e.g., flash the light source 208 or play a sound through the speaker 218) signaling which bottle is indicated.

The application 20 may also include a search feature that works in conjunction with the inventory and bottle finder features. The search feature may allow a user to search for a particular bottle of wine by entering certain criteria. The criteria may include, for example, wine type, age, origin, maturity, flavor, etc. Once one or more search criterion is entered, the application 20 may compare the requested information to the cataloged information stored in the digital library. For example, a user may search for a Cabernet Sauvignon, of French origin, that is at least 10 years old, having a dry finish. If of a collection of five hundred wine bottles, fifteen bottles match the description, the application 20 will list the fifteen bottles of wine that match the search query. In addition the application 20 may enable a bottle finder feature, in which the electronic devices 10 attached to the fifteen bottles of wine (i.e., beverage container 1) are sent a communication from the computing device 30. The communication, when received by the electronic device 10, may cause the electronic device to provide visual or audio alert (e.g., flash the light source 208 or play a sound through the speaker 218) signaling which bottles are indicated.

The application 20 may also include a quick information feature. The quick information feature may allow a user quickly access information about a particular bottle of wine. For example, if a user actuates an actuator 214 on the electronic device 10, the electronic device may transmit a communication to the application 20 via the computing device 30. The application may in turn show information about the bottle of wine (i.e., beverage container 1) that has been associated with that particular electronic device.

The application 20 may also include a temperature feature. The temperature feature may record the temperature readings transmitted by the electronic device 10 taken by a temperature sensor 220. The application 20 may monitor the air temperature that the bottle 1 is stored in and provide the average temperature that the bottle 1 has been stored in along with maximum and minimum temperatures. The application 20 may also include a temperature warning feature that may be turned on or off, so that a user is notified of any out of parameter temperatures as described in the notification feature above.

The application 20 may also include a movement tracking or recognition feature. The movement recognition feature may record accelerometer data transmitted by the electronic device 10 taken by an accelerometer 210. The application 20 may monitor whether a particular electronic device 10 has moved and provide information about the date and time when that particular electronic device 10 was moved. The application 20 may also include a movement alarm feature that may be turned on or off, so that a user is notified if a particular bottle of wine is moved as described in the notification feature above.

The application 20 may also include a battery indicator feature. The battery indicator feature may notify a user of the state of a battery charge for the electronic devices 10 paired to the application 20. For example, the application may send a notification if the battery charge level falls beneath a certain set threshold, in one example 20%. The application may also include a battery charge overview feature allowing a user to see the charge of each electronic device 10 paired to the application 20.

Figure 2:
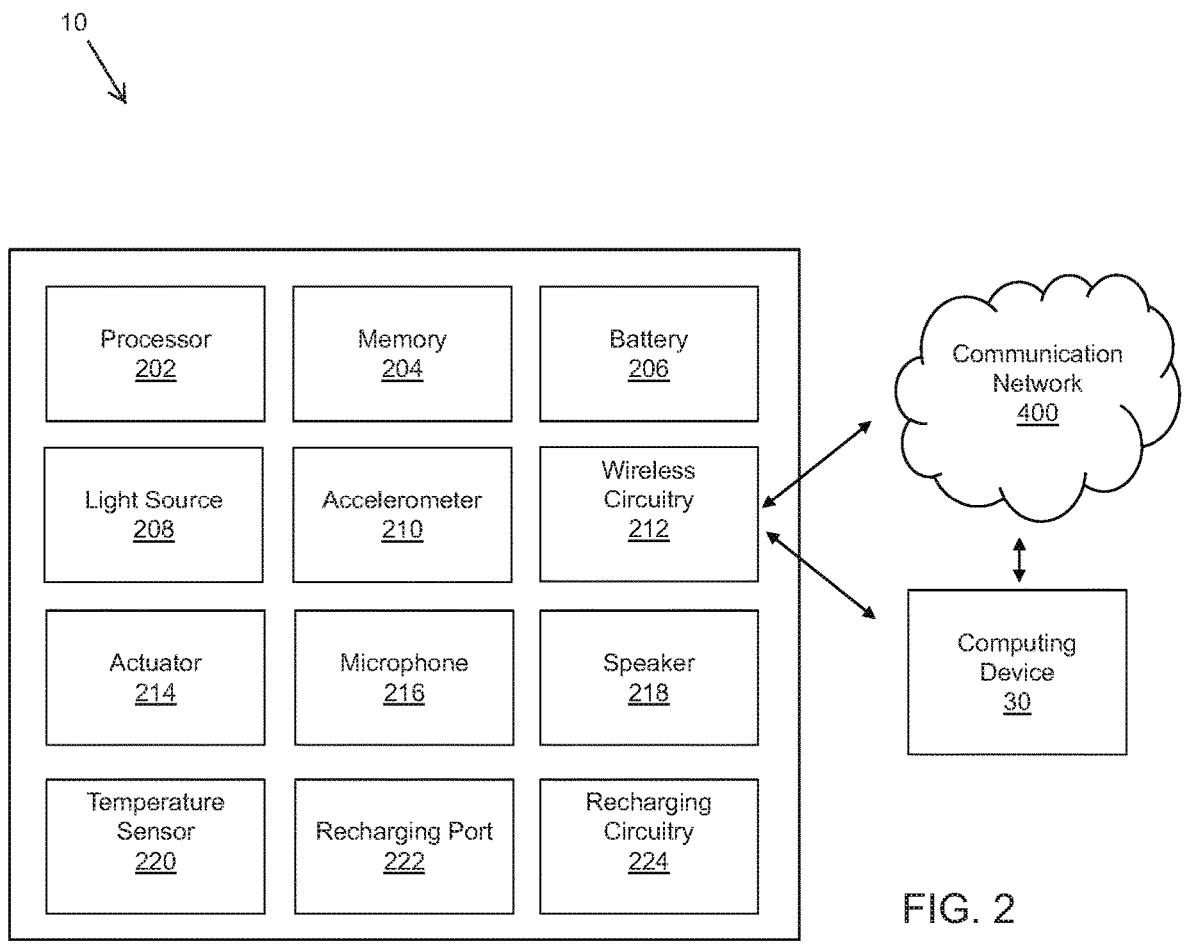
FIG. 2 is a block diagram illustrating a system including an electronic device and a computing device, in accordance with aspects of the disclosure.

FIG. 2 is a block diagram illustrating a system including an electronic device and a computing device, in accordance with aspects of the disclosure. The electronic device 10 may include, for example, a processor 202, memory 204, a battery 206, a light source 208, an accelerometer 210, wireless circuitry 212, at least one actuator 214, a microphone 216, a speaker 218, a temperature sensor 220, a recharging port 222, and/or recharging circuitry 224. FIG. 2 also shows that the electronic device 10 via the wireless circuitry 212 can communicate directly with a computing device 30 or indirectly via a communication network 400 to the computing device 30.

The processor 202 may comprise suitable logic, circuitry, interfaces and/or code that may be operable to manage and/or control operations of various components and/or modules in the electronic device 10. As utilized herein, the term "processor" can include a single processor or multiple processors. The processor 202 may utilize an operating system (OS) that enables the execution of various functions, commands, and/or applications. The processor 202 may be one processor or a plurality of processors operating in a coordinated way to achieve a desired function/result.

Memory 204 may be operable to store information such as executable instructions and/or data that may be utilized by the processor 202 and/or other modules or components in the electronic device 10. Memory 204 may comprise RAM, ROM, low-latency nonvolatile memory such as flash memory, EEPROM and/or other suitable electronic data storage.

The battery 206 may be operable to provide power to the various components and/or modules of the electronic device 10. As utilized herein, the term "battery" can include a single battery or multiple batteries. The battery 206 may comprise a single-cell or multi-cell lithium type battery. For example, a 3V CR2450 Lithium Coin Cell battery may be used. Alternatively, alkaline or zinc-carbon batteries (including AA, AAA, C, D, and 9V type batteries), lithium polymer, NiMH or NiCd, and/or lead-acid type batteries may be used. The battery 206 may be rechargeable, and suitable recharging circuitry 224 may be included to recharge the battery 206 via a power source, such as a USB power source received via a recharging port 222 in the electronic device 10.

The light source 208 may comprise one or more light emitting diodes (LEDs) optionally of different colors. The light source 208 may be mounted within the electronic device 10 and configured to emit light visible from the exterior of the enclosure 201 through at least one aperture. The processor 202 may control the light source 208 and may be programmed to convey different information based on the color and/or type of light emission. For example, the following functions may be programmed: connection established, flash of green light, communication in progress, solid white light; location identification, pulsating blue light; alarm, fast flashing red light; low battery, slow flashing orange light; etc. The disclosure is not limited to the example light emissions and their associated meanings listed above. It is understood that the light emissions and their associated meanings can be customized consistent with the disclosure.

The accelerometer 210 may be operable to detect a movement of the electronic device 10. As utilized herein, the term "accelerometer" can include a single accelerometer or multiple accelerometers or may include a micromachined microelectromechanical system (MEMS). The accelerometer 210 may comprise a single-axis or multi-axis accelerometer (in which at least two accelerometers would be implemented). For example, the accelerometer may be able to detect the following: (1) whether the electronic device 10 is moving or not moving; (2) the acceleration of the electronic device 10; (3) the duration of the movement of the electronic device 10; and/or (4) the dimension of the movement of the electronic device 10. The accelerometer 210 may be configured to generate a movement signal encoding the sensed movement. A movement signal may include information relating the duration, acceleration, speed, and/or dimension of the movement. The local processor may determine these characters locally, or the raw data from the accelerometer 210 may be transmitted remotely (for example, to the application 20) where the data is interpreted/processed to determine the characters.

The wireless circuitry 212 (for example, including a transceiver) may be operable to provide wireless interface with the communication network 400 and/or computing device 30 executing application 20. The communication network 400 may comprise suitable logic, circuitry, interfaces, devices and/or code that may be operable to provide communication of one or more electronic devices 10 with one or more computing devices 20, by using wireless communication technologies (e.g., Bluetooth, WiFi, LTE, NFC, etc.). The communication network 400 may comprise, for example, local area network (LAN), Internet and/or other multimedia network, cloud-based servers.

The at least one actuator 214 may be configured to actuate and the processor 202 may operable to detect an actuation of the at least one actuator 214. The at least one actuator 214 may comprise a physical button. The at least one actuator 214 may at least in part by constructed of a translucent material to allow light from light source 218 to pass through the at least one actuator 214 and be visible from the exterior of the electronic device 10. In one example embodiment, the at least one actuator 214 may comprise two actuators 214a and 214b. Both of actuators 214a and 214b may have a round shape. The two actuators 214a and 214b may have different functions. For example, the actuator 214a may have a record function and actuator 214b may have a playback function. The at least one actuator 214 may comprise more or less actuators as described above. It is to be understood that the present disclosure is not limited to any particular shape of the at least one actuator 214.

The processor 202 may be configured to detect an actuation of the at least one actuator 214. The processor 202 may be able to detect the following: (1) whether the at least one actuator 214 is actuated or not actuated; (2) how many times the at least one actuator 214 is actuated; (3) the identity of the at least one actuator 214; and/or (4) a duration of the actuation of the at least one actuator 214. The processor 202 may be able to attribute different functions based on the type of actuation. For example, the processor 202 may be able to detect whether the at least one actuator 214 was actuated in succession within a pre-defined period of time: for example once, twice, three times, etc. Pressing one or both of actuators 214a and 214b for a duration of time or repeatedly may control the following operations: placing the electronic device 10 in a pairing mode; resetting the electronic device 10; and/or checking the battery status of the electronic device 10.

The microphone 216 may be operable to receive an auditory signal. As utilized herein, the term "microphone" can include a single microphone or multiple microphones. The processor 202 may be configured record the auditory signal (as output from the microphone 216) and store a representation of the auditory signal on the memory 204. In one example embodiment, the microphone 216 may be configured to receive an auditory signal subsequent to the processor 202 detecting an actuation of the at least one actuator 214. Alternatively, the microphone 216 may be configured to receive an auditory signal concurrent to the processor 202 detecting an actuation of the at least one actuator 214.

The speaker 218 may be operable to play the representation of the auditory signal stored on memory 204. The speaker 218 may include the necessary circuitry to play the representation of an auditory signal stored on the memory 204. The speaker 218 may, for example, be a piezoelectric speaker or electrodynamic speaker typically found in a smart phone. In one example embodiment, the speaker 218 may be configured to play the representation of the auditory signal stored on memory 204 subsequent to the processor 202 detecting an actuation of the at least one actuator 214. Alternatively, the speaker 218 may be configured to play the representation of the auditory signal store on the memory 204 concurrent to the processor 202 detecting an actuation of the at least one actuator 214.

The temperature sensor 220 may be an electrical temperature sensor (active or passive) operable to generate a temperature signal that corresponds to the measured temperature. The temperature sensor 220 may include circuitry to allow the temperature sensor 220 to interact with the processor 202. The processor 202 may be configured to cause the temperature sensor 220 to periodically generate the temperature signal according to a pre-set time interval. The processor 202 may also be configured to cause the wireless communication circuitry 212 to wirelessly transmit a communication including data reflective of the measured temperature to the application 20 via computing device 30 and/or communication network 400. Additionally, the processor 202 may be configured to send the communication at a specific interval. The processor may further be configured to activate the speaker 218 and/or light source 208 if the recorded temperature matches a certain pre-programmed threshold. For example, if the processor 202 detects that temperature sensor 220 has generated a temperature signal that the air temperature 100 degrees Fahrenheit and the pre-programmed upper threshold temperature is 75 degrees Fahrenheit, the processor 202 may trigger an alarm by activating the speaker 218 and/or light source 208 to indicate the exceeded temperature. The processor 202 may also be configured to cause the wireless communication circuitry 212 to wirelessly transmit a communication including data reflective of the measured temperature to the application 20 via computing device 30 and/or communication network 400, if the measured temperature exceeds a threshold. The temperature limits may be pre-programed on the electronic device 10 or configured via the application 20.

The recharging port 222 and recharging circuitry 224 may be operable to recharge the battery(ies) 206. The recharging port 222 may be a USB, micro-USB, or USB-C type port. The recharging port 222 may be operable to establish a wired link/connection in order to interface with and/or control the wireless device 10. The recharging circuitry 224 may be operable to wirelessly charge the battery(ies) 206. The wireless charging protocols may include radio charging, inductive charging, resonance charging, dipole coil resonant system, and/or uBeam. The recharging circuitry 224 may use the Qi standard of inductive charge. The recharging circuitry 224 may be configured to detect the charge level of battery (ies) 206. The processor 202 may be configured to cause the wireless communication circuitry to wirelessly transmit a communication including data reflective of the battery charge level to the application 20 via computing device 30 and/or communication network 400. The processor 202 may be configured to send the communication at a specific interval. The processor may further be configured to activate the speaker 218 and/or light source 208 if the battery charge level depletes beyond a certain pre-programmed threshold. For example, if the recharging circuitry 224 detects that the battery(ies) have a 15% charge and pre-programmed charge threshold is 20% percent, the processor may trigger an alarm by activating the speaker 218 and/or light source 208 to indicate the low battery level. The processor 202 may also be configured to cause the wireless communication circuitry 212 to wirelessly transmit a communication including data reflective of battery charge level to the application 20 via computing device 30 and/or communication network 400, if the battery charge drops beneath a pre-set threshold. The battery charge thresholds may be pre-programed on the electronic device 10 or configured via the application 20.

Figure 3:
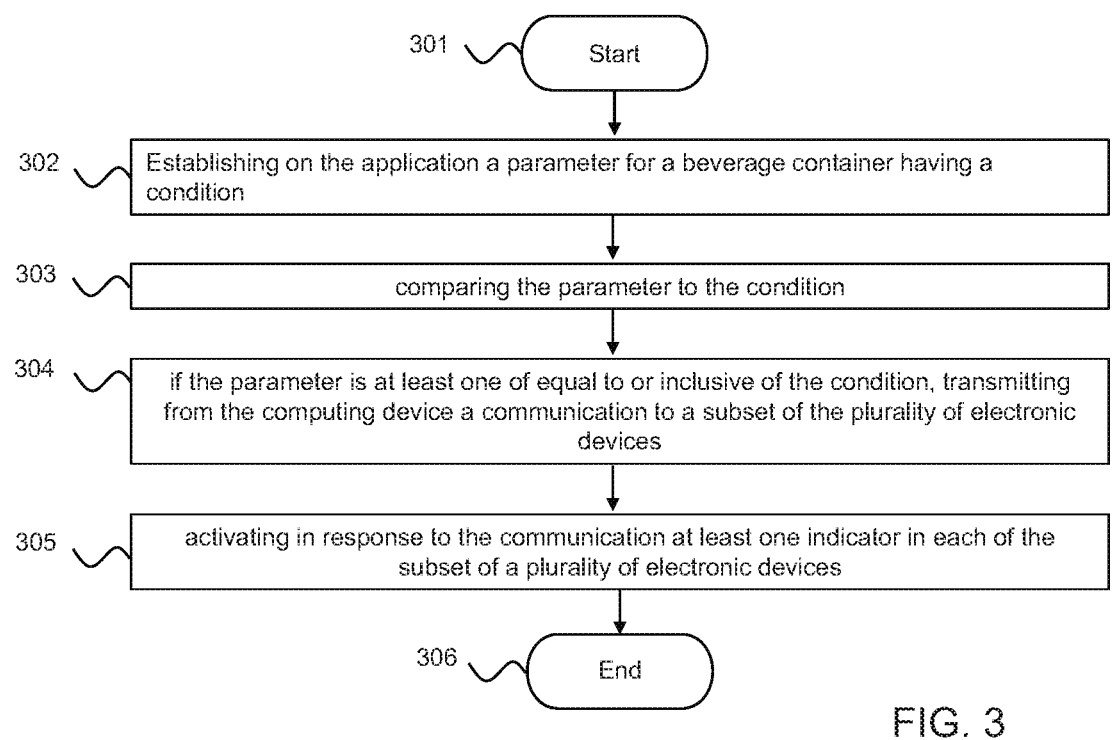
FIG. 3 is a flow chart illustrating example steps for wirelessly transmitting a communication from an application configured to run on a computing device to at least one of a plurality of electronic devices each configured to attach to a respective neck of a beverage container, in accordance with aspects of the disclosure.
Figure 4:
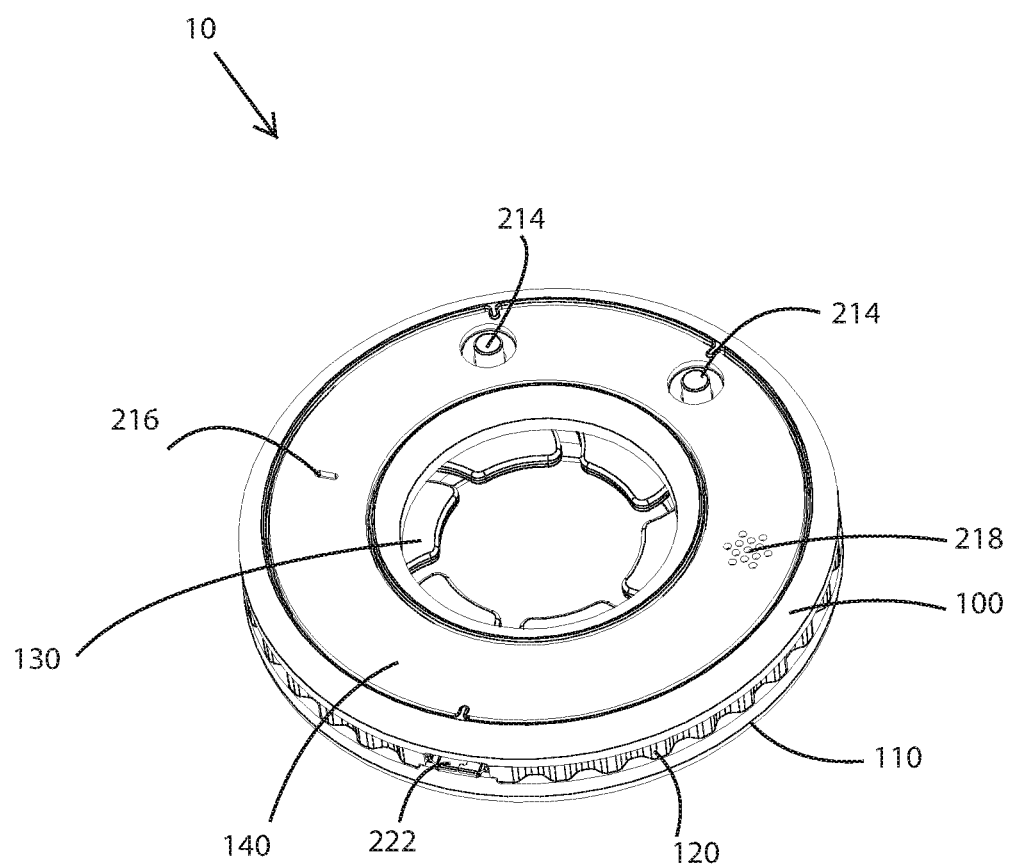
FIG. 4 is a top-perspective view of an example electronic device configured to attach to a neck of a beverage container, in accordance with aspects of this disclosure.
Figure 5:
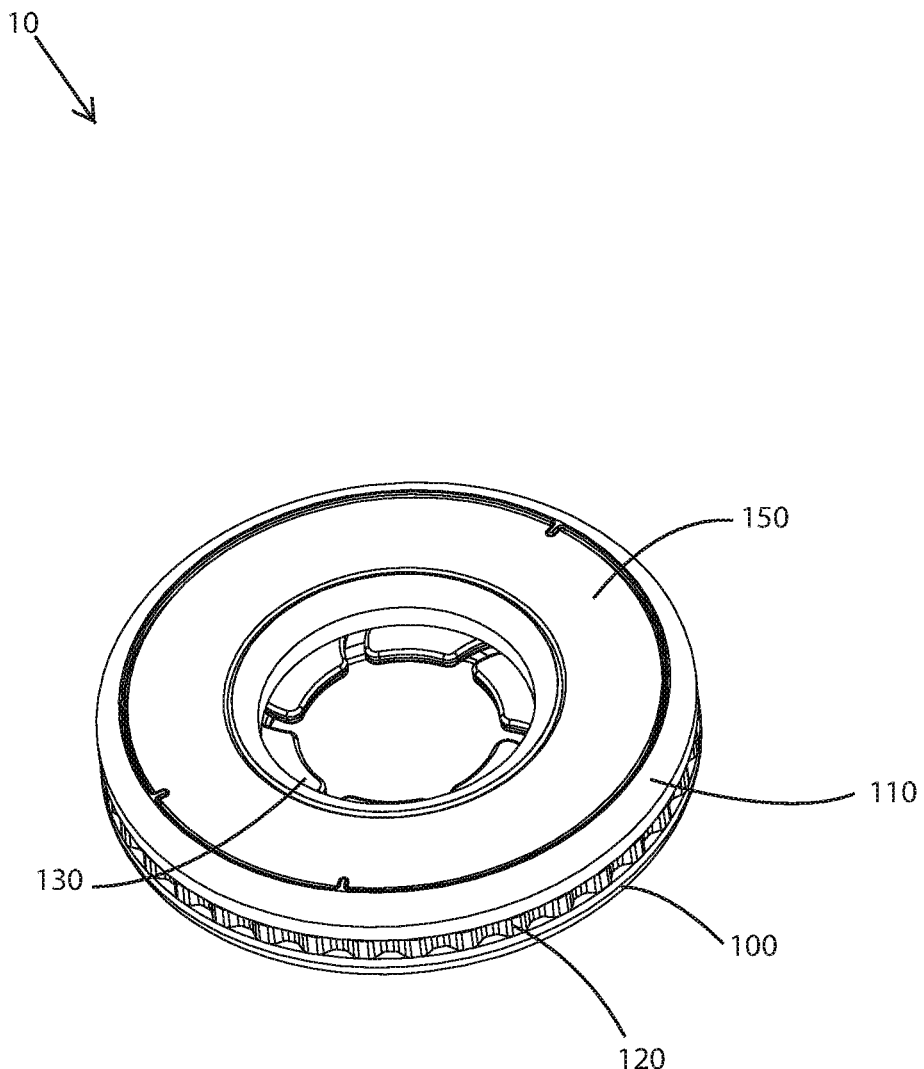
FIG. 5 is a bottom-perspective view of the example electronic device of FIG. 4.

FIG. 3 is a flow chart illustrating example steps for wirelessly transmitting a communication from an application 20 configured to run on a computing device 30 to at least one of a plurality of electronic devices 10 each configured to attach to a respective neck 2 of a beverage container 1, in accordance with an example embodiment of the disclosure. Referring to FIG. 3, the example steps start at step 301. At step 302, a parameter for a beverage container having a condition is established on the application 20. At step 303, the parameter is compared to the condition. At step 304, if the parameter is equal to or inclusive of the condition, a communication is transmitted from the computing device 40 to a subset of the plurality of electronic devices 10. At step 305, the at least one indicator (e.g., light source 208 and/or speaker 218) is activated in each of the subset of a plurality of electronic devices. The example steps may proceed to the end step 306. It is to be understood that the present disclosure is not limited the specific order of steps 301 to 306—other orders are possible. Steps may also be performed in parallel.

For example, at step 302, a user may attach the electronic device 10 onto the neck 2 of a beverage container 1 by sliding the electronic device 10 onto the neck 2 of the beverage container 1. In an alternative embodiment, the electronic device 10 may clamp onto the neck 2 of the beverage container 1. At step 303, the electronic device 10 may be linked to the application 20 via the computing device 30 by link 40. This link 40 may either be direct or indirect via communication network 400. Further at step 303, a parameter having a condition is established on the application 20. The parameter and condition can include, but are not limited to, a bottle of wine becomes mature on a certain date, playing a recording on a certain date or at the push of actuator 214, a bottle of wine should be opened on a certain date, and/or the search result of a preset condition such a wine type. At step 304, the parameter is compared to the condition. At this step the application compares the parameter of wine type, time, date, temperature, movement, etc. or others to the set condition which may include a specific wine type, time, date, temperature, whether the electronic device 10 is moving. The condition may be met in the following example scenarios: if the wine type of cataloged wines (i.e., the beverage container 1 to which the respective one or the plurality of electronic devices 10 is attached to) matches the wine type that has been search for (i.e., the condition); if the current date is the same as or exceeds a matureness date set for a specific bottle of wine; if the current date is the same as or exceeds a special event date set for a specific bottle of wine; if the measured temperature (e.g., measured by the temperature sensor 220) is lower than, or exceeds, a safe temperature threshold; if the accelerometer 210 detects that the electronic device 10 is moving if the movement alarm has been set. The disclosure is not meant to limit the parameters and conditions to the ones described above. It is understood that other parameters and conditions may be specified and are consistent with the disclosure.

At step 305, if the parameter is equal to or inclusive of the condition as described above, a communication is transmitted from the computing device 30 to a subset of the plurality of electronic devices 10. In the example in which a wine type is searched for, the communication is transmitted to each of the electronic devices 10 attached to wine bottles (i.e., beverage containers 1) that are of the same type as the searched for wine type (i.e., the condition). The wine type may also include the place of origin, the age, whether the wine is mature, etc. At step 306, in response to the communication, the at least one indicator (e.g., light source 208 and/or speaker 218) is activated on each of the subset of the plurality of electronic devices 10 in which the parameter has met the condition. For example, when a wine type of Cabernet Sauvignon from France that is at least 10 years old is searched, if of an example five hundred electronic devices, fifteen electronic devices 10 are attached to wine bottles that contain a Cabernet Sauvignon from France that is at least 10 years old, then each of those fifteen electronic devices would be indicated (e.g., the light source 208 would emit light and/or the speaker 218 would make some sound).

Figure 9:
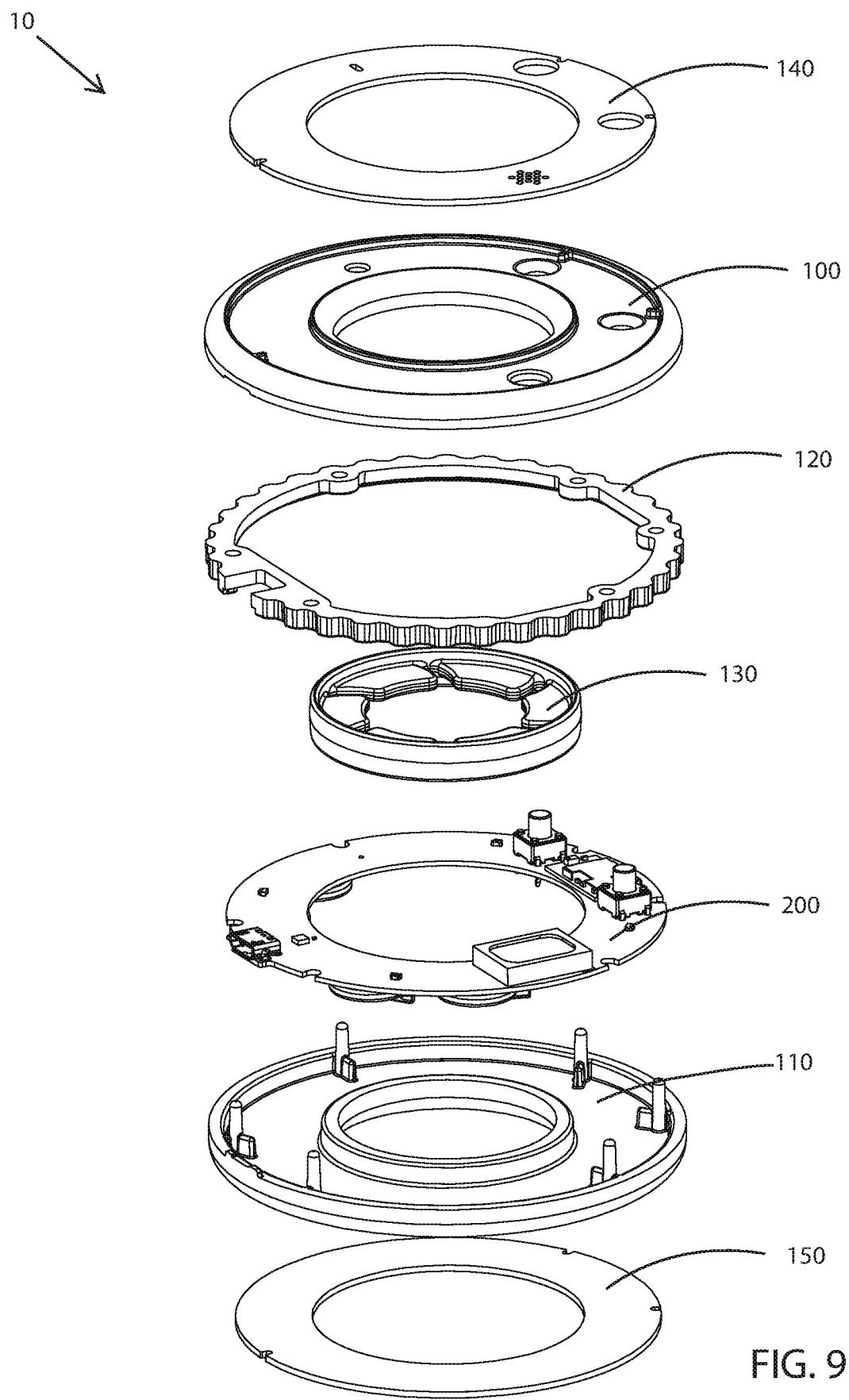
FIG. 9 is an exploded perspective view of the example electronic device of FIG. 4, showing the internal components of the electronic device.

FIGS. 4-8 show an example embodiment of the electronic device 10. FIGS. 4-8 show the electronic device 10 having a donut shape. Other shapes are also possible. For example, the electronic device 10 could have a U-shape, or be rectangular. The electronic device 10 may include a top case 100, a bottom case 110, a light ring 120, a receiving portion 130, a top skin 140, a bottom skin 150, and a circuit board 200. FIG. 9 shows an example exploded view of how the top case 100, bottom case 110, light ring 120, receiving portion 130, top skin 140, a bottom skin 150, and circuit board 200 are arranged and assembled to form the electronic device 10. For example, the circuit board 200, light ring 120, and receiving portion 130, may integrate with the top case 100 and bottom case 110. In one embodiment, the circuit board 200, light ring 120, and receiving portion 130 are sandwiched between the top case 100 and bottom case 110. In one example, the bottom case 110 may include one or more posts 115 extending from an interior surface 119 of the bottom case 110. The post(s) 115 may provide an anchor for at least some of the other internal components. For example, the circuit board may include one or more slots 205 configured to align with the post(s) 115. Additionally, the light ring 120 may include on or more post apertures 125 configured to align with the post(s) 115, such that the post(s) 115 may be inserted through the post aperture(s) 125. Finally, the top case 100 may include on or more post engaging portions 105 positioned on an interior surface 109 of the top case. The post engaging portions 105, may have a cup shape and may be configured to align with the post(s) 115 and allow the post(s) 115 to be inserted. In one example, the post(s) 115 are removably engaged with the post engaging portion(s) 105 via a friction fit, allowing disengagement of the post(s) 115 from the post engaging portion(s) 115 with the application of a sufficient amount of removal force. In another example, the post(s) 115 are engaged with the post engaging portion(s) 105 via a snap fit.

Figure 10:
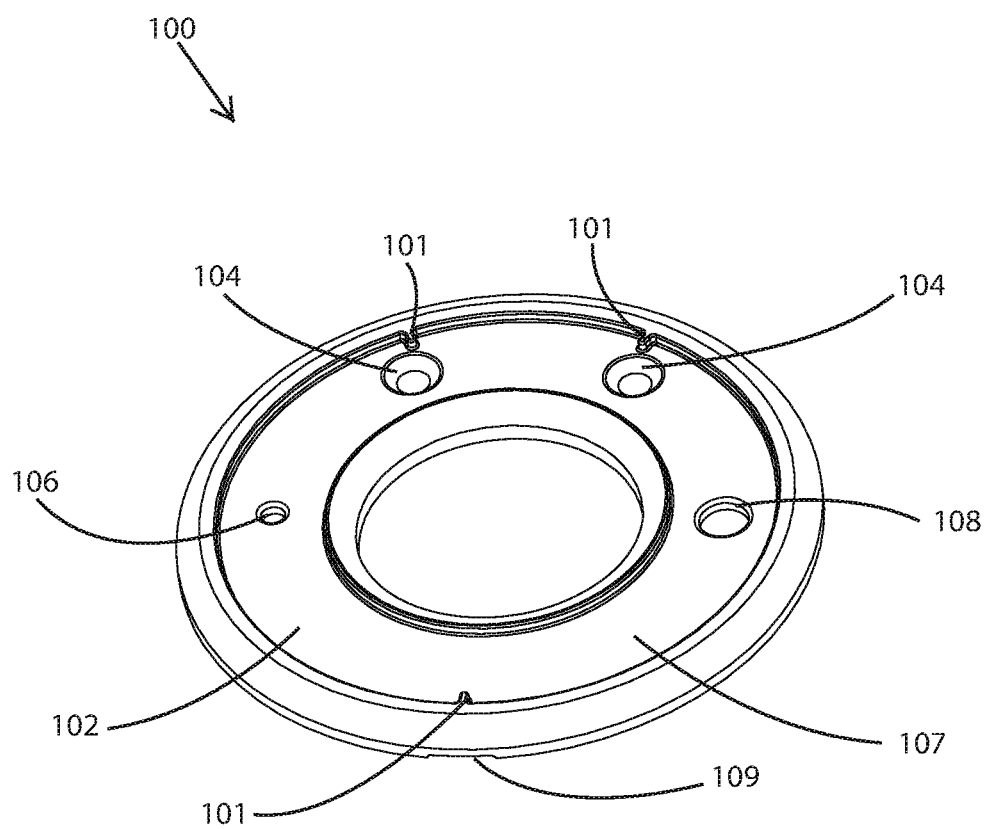
FIG. 10 is a top-perspective view of an example top case of the electronic device of FIG. 4.
Figure 11:
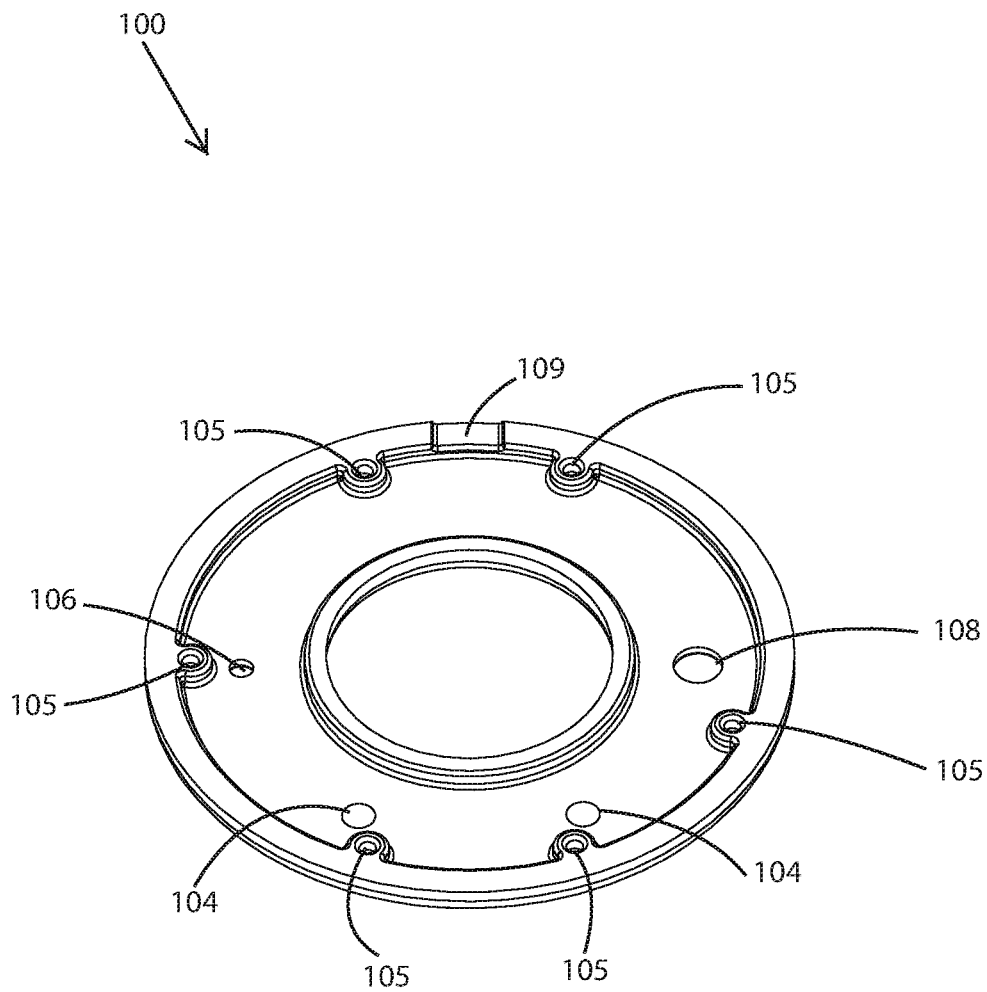
FIG. 11 is a bottom-perspective view of an example top case of the electronic device of FIG. 4.
Figure 12:
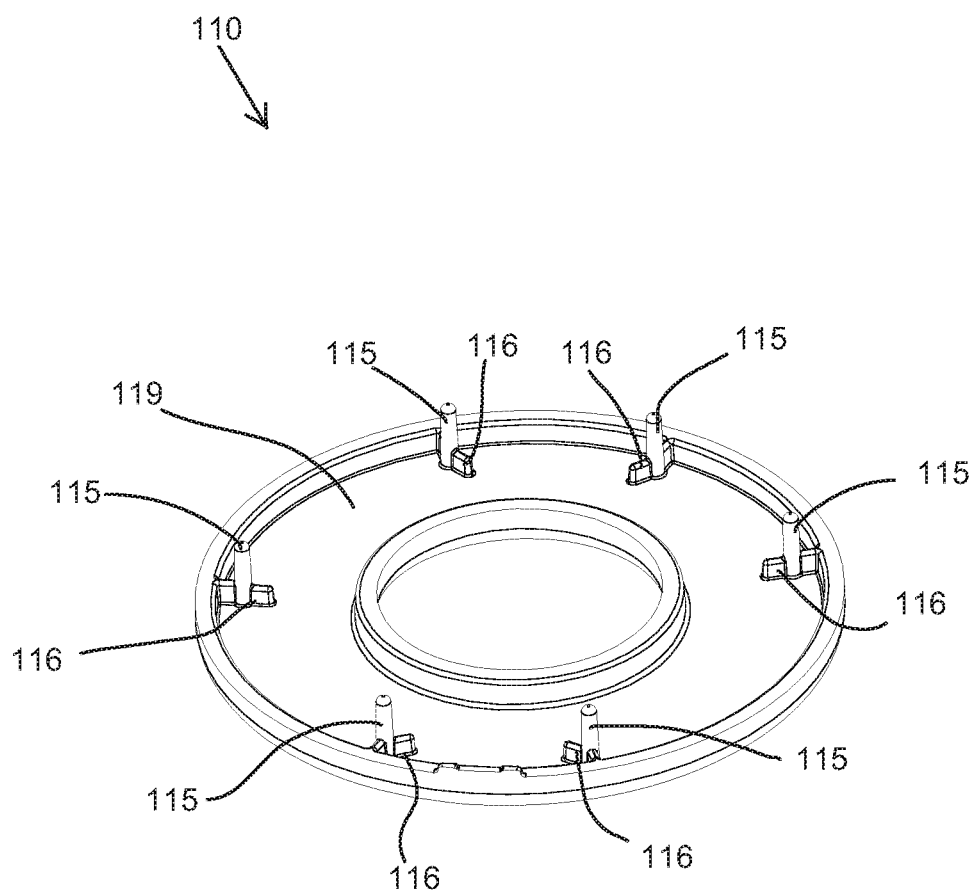
FIG. 12 is a top-perspective view of an example bottom case of the electronic device of FIG. 4.

FIGS. 10 and 11 show an example top case 100 of the electronic device 10. The top case 100 may include one or more actuator apertures 104 configured to align with one or more actuators 214 when the circuit board 200 is installed in the electronic device 10. The actuator aperture 104 may allow at least a portion of the actuator 214 to extend beyond the exterior of the top case 100. The top case 100 may also include a microphone aperture 106 and a speaker aperture 108. The microphone aperture 106 may be configured to align with the microphone 216 when the circuit board 200 is installed in the electronic device 10. Likewise, the speaker aperture 108 may be configured to align with the speaker 218 when the circuit board 200 is installed in the electronic device 10. The top case 100 may also include one or more protruding portions 101 positioned in a recess 102 on an outer surface 107 of the top case 100. The recess 102 may be configured to have a top skin 140 inserted. The protruding portion(s) 101 may help pinch the top skin 140 into the recess 102. The protruding portion(s) 101 may also help align the top skin 140 into a correct orientation within the recess 102. One embodiment includes three protruding portions 101, in which two of the protruding portions 101 are positioned proximate the actuator apertures 104 and the third protruding portion 101 is positioned at an opposite side of the recess 102. The top case 100 may also include a recharging port notch 103 configured to align and surround a portion of the recharging port 222 when the circuit board is installed in the electronic device 10. As described above, the top case may also include one or more post engaging portions 105 positioned on an interior surface 109 of the top case (FIG. 11). The post engaging portions 105 may have a cup shape and may be configured to align with the post(s) 115 of the bottom case 110 and allow the post(s) 115 to be inserted. The top case 100 may be constructed from a colored or clear ABS plastic or polycarbonate.

FIG. 11 shows an example bottom case 110 of the electronic device 10. As described above, in one example, the bottom case 110 may include one or more posts 115 extending from an interior surface 119 of the bottom case 110. The post(s) 115 may provide an anchor for at least some of the other internal components. The post(s) 115 may also include a ledge 116 configured to allow the circuit board 200 to sit on the ledge 116. The bottom case 110 may also include one or more protruding portions 111 positioned in a recess 112 on an outer surface 117 of the bottom case 110. The recess 112 may be configured to have a bottom skin 150 inserted. The protruding portion(s) 111 may help pinch the bottom skin 150 into the recess 112. The protruding portion(s) may also help align the bottom skin 150 into a correct orientation within the recess 102. One embodiment includes three protruding portions 111. The bottom case 110 may be constructed from a colored or clear ABS plastic or polycarbonate.

Figure 13:
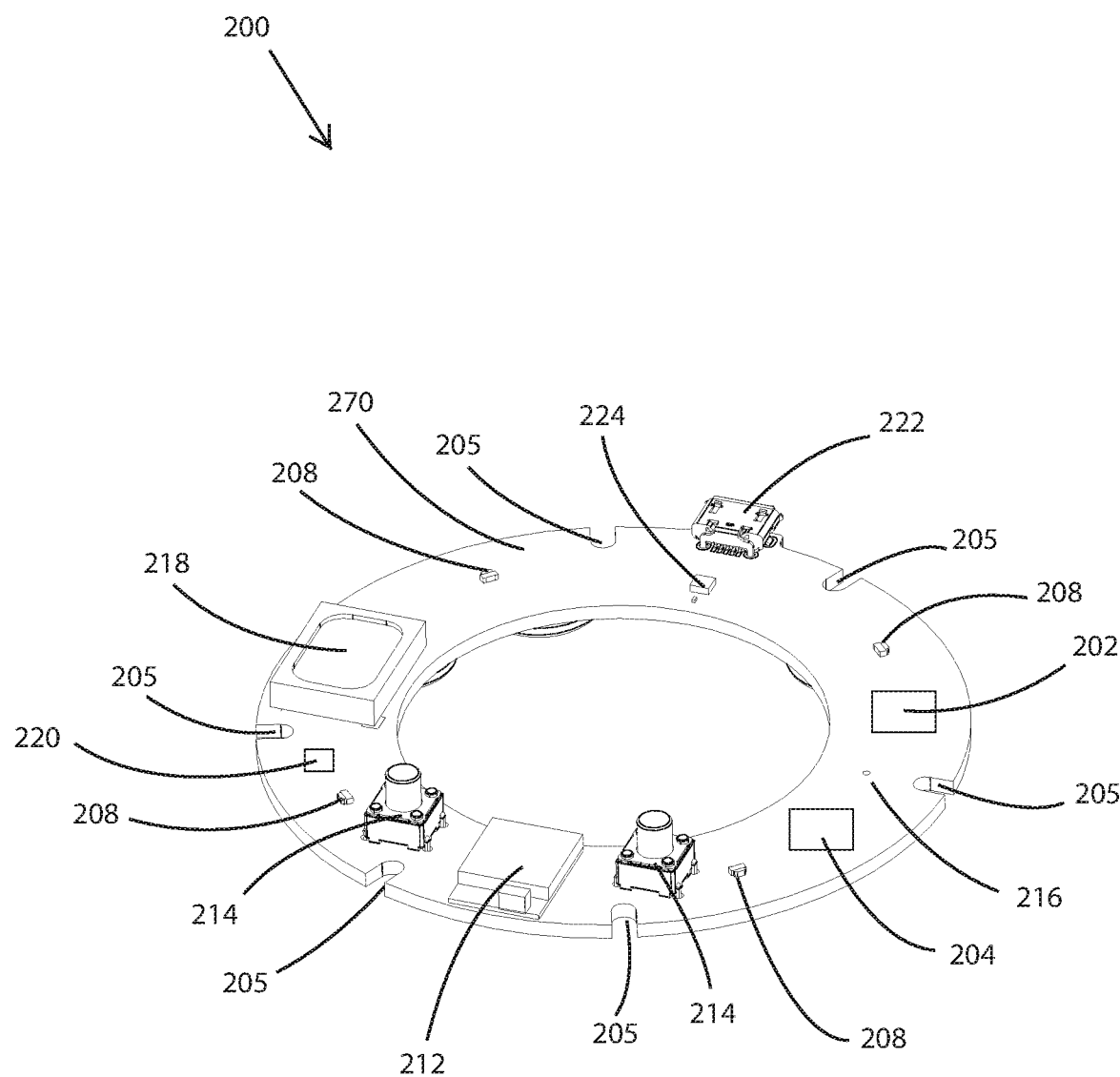
FIG. 13 is a top-perspective view of an example circuit board of the electronic device of FIG. 4.
Figure 14:
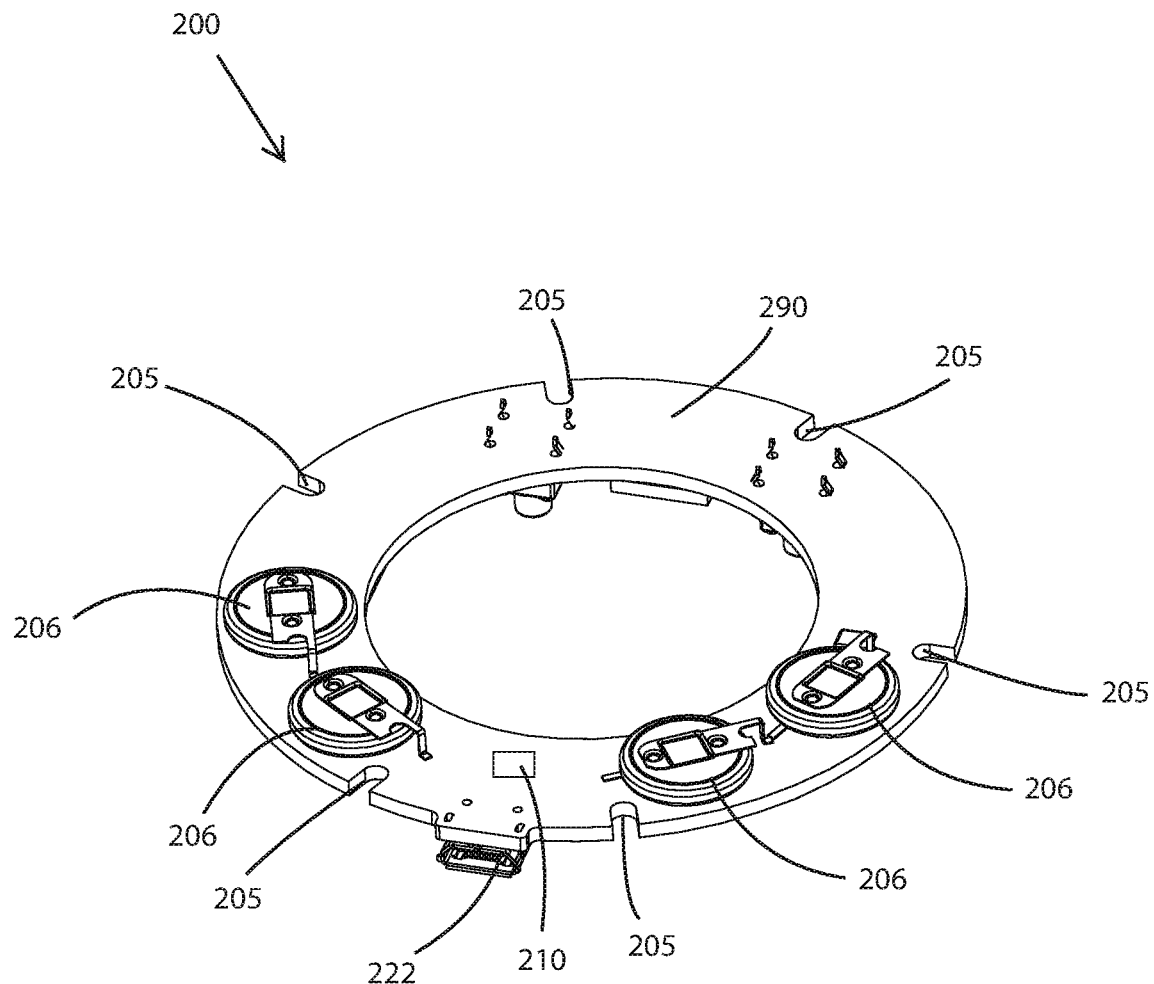
FIG. 14 is a bottom-perspective view of an example circuit board of the electronic device of FIG. 4.

FIGS. 13 and 14 show an example circuit board 200 of the electronic device 10. The circuit board 200 may be a printed circuit board (PCB). The PCB may be a single sided PCB, double sided PCB, multilayer PCB, rigid PCB, flex PCB, and/or rigid-flex PCB. In one example, the circuit board 200 is substantially donut shaped (i.e., toroidal shaped or includes a toroidal shape) double sided PCB. Other shapes are also possible within the disclosure. For example, if the electronic device 10 is substantially U-shaped, the circuit board 200 may be substantially U-shaped. By contrast, if the electronic device 10 is rectangular, the circuit board 200 may be rectangular. As described in detail above with reference to FIG. 2, the circuit board may include, for example, a processor 202, memory 204, one or more batteries 206, one or more light sources 208, an accelerometer 210, wireless circuitry 212, at least one actuator 214, a microphone 216, a speaker 218, a temperature sensor 220, a recharging port 222, and/or recharging circuitry 224. In one example, the circuit board 200 includes four light sources 208 positioned equidistant from each other on a first surface 270 of the circuit board. The microphone 216 and speaker 218 may be positioned on opposite sides of the first surface 270 of the circuit board 200. In another example, the circuit board 200 may include two actuators 214 positioned proximate each other on the first surface 270 of the circuit board 200. The processor 202, memory 204, wireless circuitry 212, temperature sensor 220, recharging port 222, and/or recharging circuitry 224 may also be positioned on the first surface 270 of the circuit board 200. The battery(ies) 206 may be positioned on a second surface 290 of the circuit board 200. In one embodiment, the circuit board 200 includes four batteries 206. The accelerometer may be positioned on the second surface 290 of the circuit board 200. It is to be understood that the configuration described above is provided as an example. Other configurations including position, orientation, and/or number or types of components are properly contemplated by the disclosure.

Figure 15:
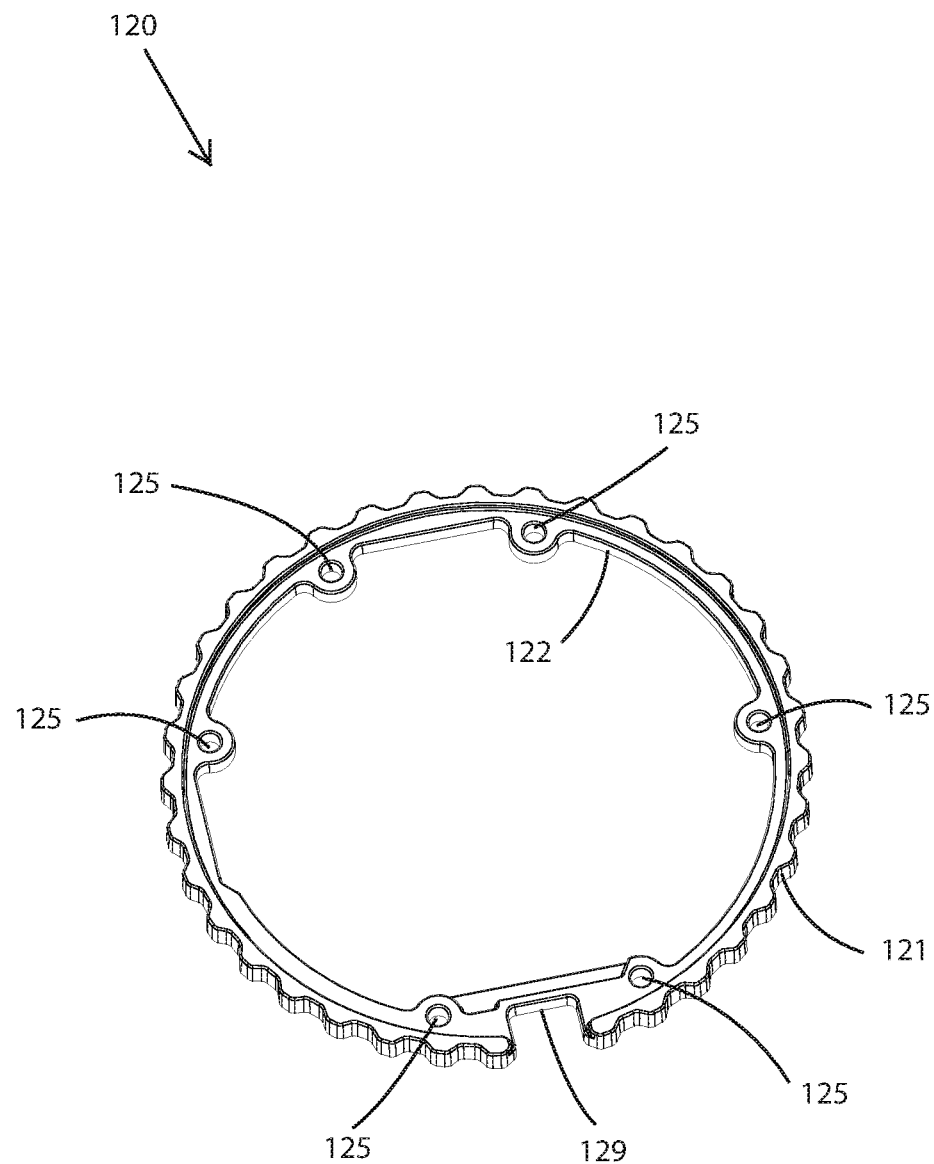
FIG. 15 is a perspective view of an example light ring of the electronic device of FIG. 4.

FIG. 15 shows an example light ring 120 of the electronic device 10. As described above, the light right 120 may include on or more post apertures 125 configured to align with the post(s) 115, such that the post(s) 115 may be inserted through the post aperture(s) 125. The light ring 120 may be positioned between the top case 100 and bottom case 110. In one example, the light ring 120 may be a traditional light guide plate (LGP) known in the art. In another example, the light ring 120 may comprise a light pipe. The light ring 120 may include a ribbed outer surface 121 providing an extended visible surface area of the light ring 120 when the light ring 120 in installed in the electronic device. The light ring 120 may also include an polished interior surface 122 configured to allow light emitted from the light source(s) 208 to pass through the light right 120. The light ring 120 may also include a notch 129 configured to accommodate the recharging port 222. The light ring 120 may be constructed of a clear polycarbonate. The light ring 120 may be constructed of a clear polycarbonate.

Figure 16:
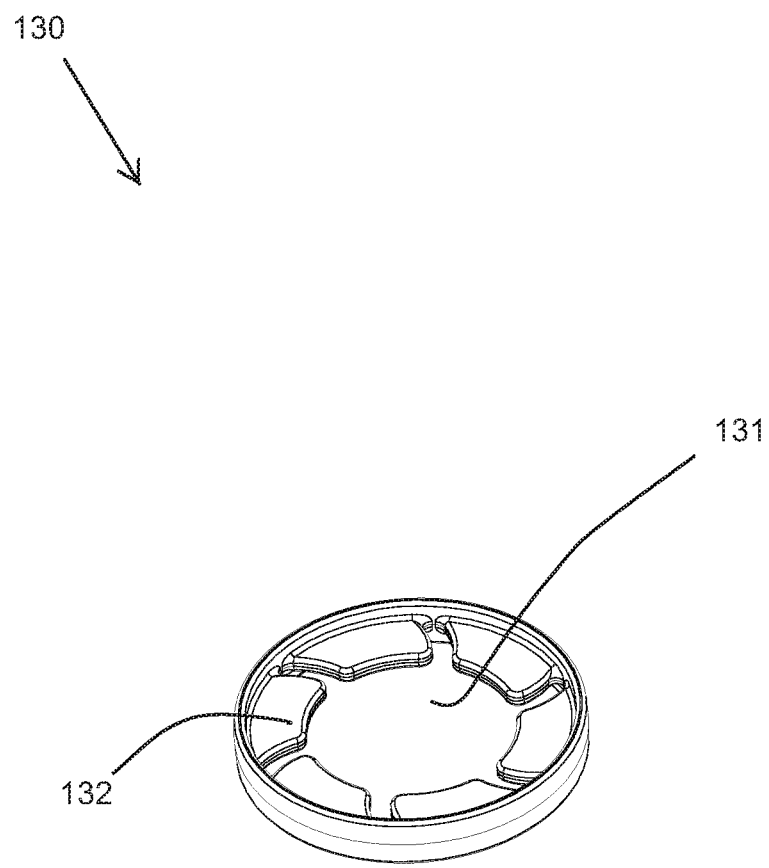
FIG. 16 is a perspective view of an example receiving portion of the electronic device of FIG. 4.

FIG. 16 shows an example receiving portion 130 of the electronic device 10. The receiving portion 130 may include an aperture 131. The aperture 131 may be configured to engage with the neck 2 of a beverage container 1. In one example, the receiving portion 130 is ring shaped and completely surrounds the aperture 131 as is shown in FIG. 15. In an alternative example, the receiving portion is substantially U-shaped or has a gap in the ring and partially surrounds the aperture 131 (not shown). The receiving portion 130 may also include one or more flaps 132. In one example, the receiving portion 130 includes six flaps 131 positioned on an interior perimeter of the receiving portion 130. The flap(s) 132 may be movable in relation to the receiving portion. For example, in one example, the flaps 132 may be flexible, thus the flap(s) 132 may be bent and/or compressed up or down, side-to-side. In another example, the flap(s) 132 may be connected to a type of hinge allowing the flap(s) 132 to pivot in respect to the receiving portion 130. In a preferred embodiment, the receiving portion 130 includes a plurality of flexible flaps 132. When the receiving portion 130 is engaged with the neck 2 of the beverage container 1, one or more of the plurality of flaps 132 is bent to accommodate the diameter of the neck 2 of the beverage container 1. The plurality of flaps 132 may have sufficient stiffness to secure or attach the receiving portion 130 and electronic device 10 to the neck 2 of a beverage container 1. In an alternative embodiment, the receiving portion 130 includes a compressible foam portion proximate the aperture 131. The foam portion may be compressed to engage with the neck 2 of a beverage container 1. The receiving portion 130 may be clamped and/or sandwiched between the top case 100 and bottom case 110.

Figure 17:
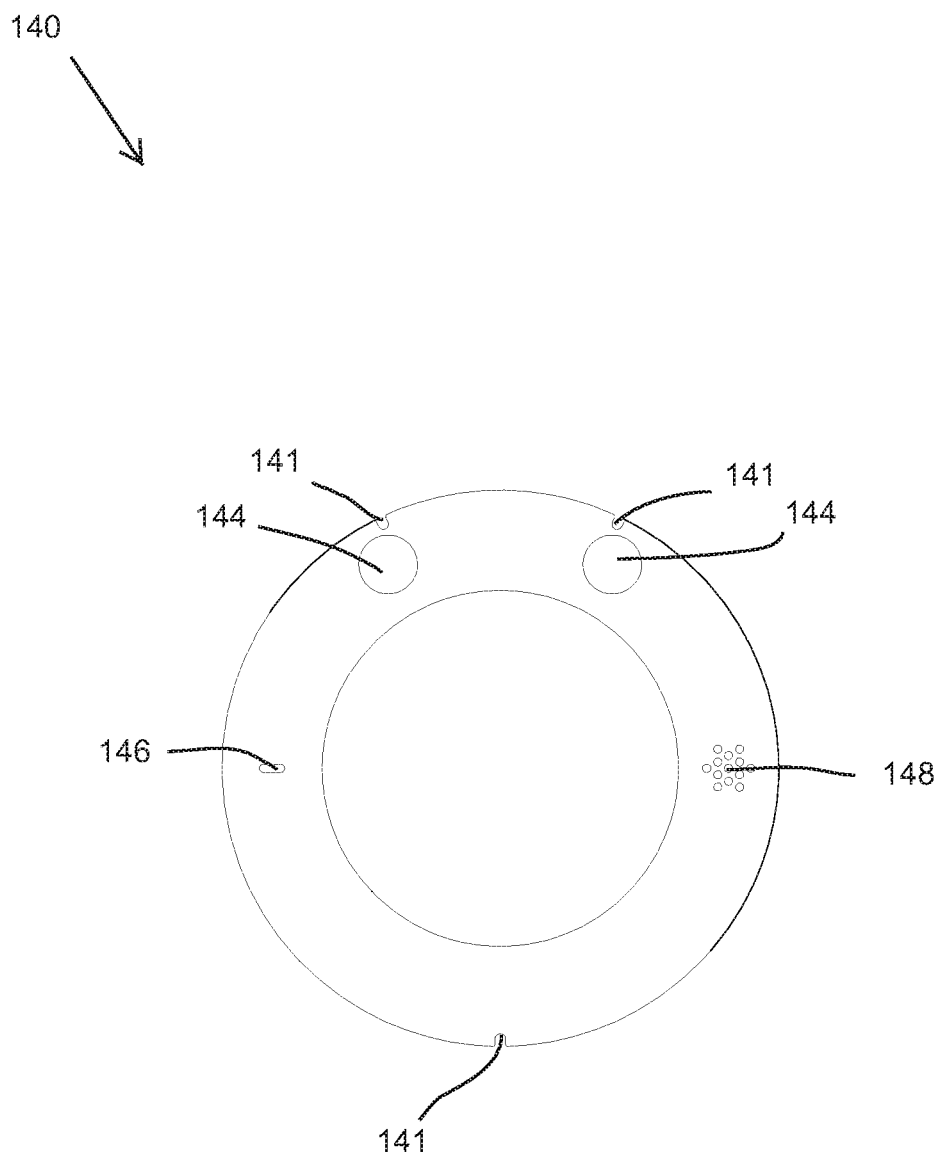
FIG. 17 is a top plan view of an example top skin of the electronic device of FIG. 4.

FIG. 17 shows an example top skin 140 of the electronic device 10. The top skin 140 may be a substantially donut shaped disc. The top skin 140 may also have alternative shapes such as a U-shape or rectangular shape. The top skin 140 may be configured to be positioned into the recess 102 of the top case 100. The top skin 140 may include one or more actuator apertures 144 configured to align with one or more actuators 214 when the circuit board 200 is installed in the electronic device 10. The actuator aperture 144 may allow at least a portion of the actuator 214 to extend beyond the exterior of the top skin 140. The top skin 140 may also include a microphone aperture 146 and a speaker aperture 148. The microphone aperture 146 may be configured to align with the microphone 216 when the circuit board 200 is installed in the electronic device 10. Likewise, the speaker aperture 148 may be configured to align with the speaker 218 when the circuit board 200 is installed in the electronic device 10. The microphone aperture 146 may be pill shaped. The speaker aperture 148 may include a plurality of apertures positioned in a star shape. Other arrangements and numbers of apertures are also possible. The top skin 140 may also include one or more notches 141 positioned on the perimeter of the top skin 140. The notches 141 may be configured to align with the protruding portions 101 of the top case 100. The top skin 140 may be made of a metal such as aluminum or any type of known plastic. In the example of the top skin 140 being made of aluminum, the aluminum may be anodized in a variety of colors. In another embodiment, the top skin 140 includes a printed logo or branding, for example, of a winery or retailer. Alternatively, a user may create a custom top skin 140.

Figure 18:
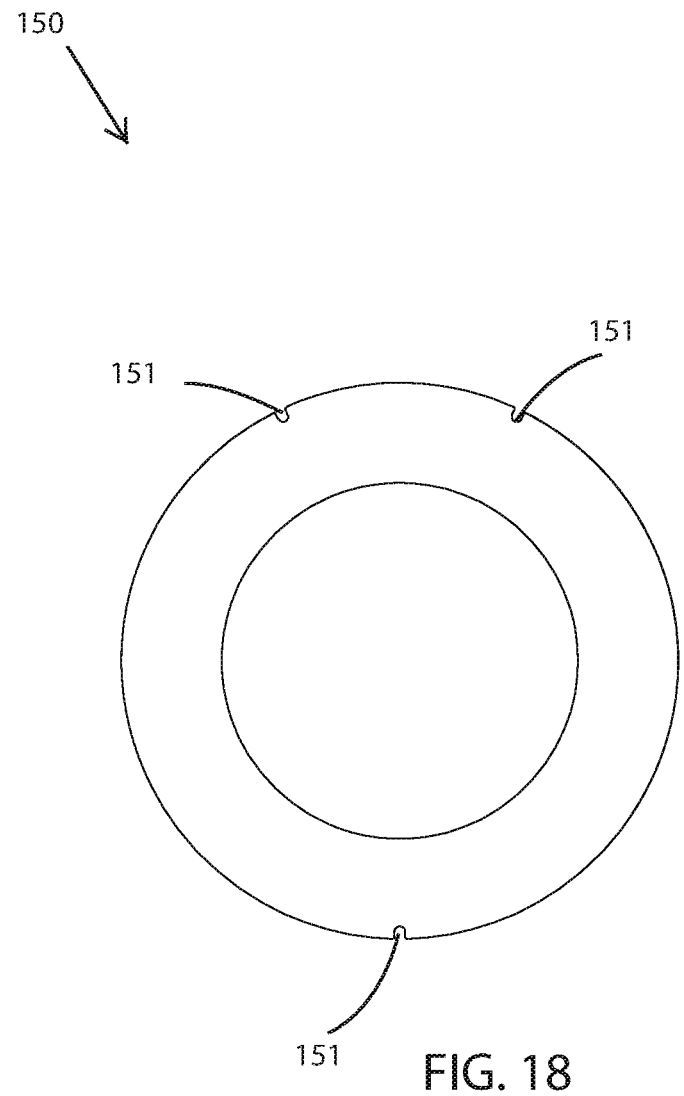
FIG. 18 is a top plan view of an example bottom skin of the electronic device of FIG. 4.

FIG. 18 shows an example bottom skin 150 of the electronic device 10. The bottom skin 150 may be substantially donut shaped disc. The bottom skin 150 may also have alternative shapes such as a U-shape or rectangular shape. The bottom skin 150 may be configured to be positioned into the recess 112 of the bottom case 110. The bottom skin 150 may also include one or more notches 151 positioned on the perimeter of the top skin 150. The notches 151 may be configured to align with the protruding portions 111 of the bottom case 110. The bottom skin 150 may be made of a metal such as aluminum or any type of known plastic. In the example of the bottom skin 150 being made of aluminum, the aluminum may be anodized in a variety of colors. In another embodiment, the bottom skin 150 includes a printed logo or branding, for example, of a winery or retailer. Alternatively, a user may create a custom bottom skin 150.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for wirelessly transmitting a communication from an application configured to run on a computing device to at least one of a plurality of electronic devices each configured to attach to a respective neck of a beverage container, the method comprising:
   establishing on the application a parameter for a beverage container having a condition;
   comparing the parameter to the condition;
   if the parameter is equal to or inclusive of the condition, transmitting from the computing device a communication to a subset of the plurality of electronic devices; and
   activating in response to the communication at least one indicator in each of the subset of a plurality of electronic devices.

2. The method of claim 1, wherein the at least one indicator comprises a visual indicator and wherein, when activated, the at least one indicator emits light.

3. The method of claim 1, wherein the at least one indicator comprises an auditory indicator and wherein, when activated, the at least one indicator emits sound.

* * * * *